United States Patent
Doelker

(10) Patent No.: US 6,994,074 B2
(45) Date of Patent: Feb. 7, 2006

(54) METHOD FOR CONTROLLING AN INTERNAL COMBUSTION ENGINE GENERATOR UNIT

(75) Inventor: Armin Doelker, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 10/512,465

(22) PCT Filed: May 10, 2003

(86) PCT No.: PCT/EP03/04895

§ 371 (c)(1),
(2), (4) Date: Oct. 26, 2004

(87) PCT Pub. No.: WO03/098793

PCT Pub. Date: Nov. 27, 2003

(65) Prior Publication Data

US 2005/0224047 A1    Oct. 13, 2005

(30) Foreign Application Priority Data

May 16, 2002 (DE) .............................. 102 21 681

(51) Int. Cl.
*F02D 7/00*     (2006.01)

(52) U.S. Cl. ..................................................... 123/319

(58) Field of Classification Search ................ 123/319, 123/395, 399, 396, 339.19, 352
See application file for complete search history.

(56) References Cited

U.S. PATENT DOCUMENTS

| 4,211,931 A |   | 7/1980 | Andrejko et al. |
| 4,377,780 A |   | 3/1983 | Bjoerklund |
| 4,454,428 A |   | 6/1984 | Kimmel et al. |
| 4,658,782 A | * | 4/1987 | Lefevre et al. ........ 123/339.21 |
| 4,851,757 A |   | 7/1989 | Baumgartner et al. |

FOREIGN PATENT DOCUMENTS

| EP | 0 059 585 B1 | 2/1982 |
| EP | 0 239 806 A  | 10/1987 |

* cited by examiner

*Primary Examiner*—Bibhu Mohanty
(74) *Attorney, Agent, or Firm*—Crowell & Moring LLP

(57) ABSTRACT

In a method of controlling rotational speed for an internal combustion-generator unit, a filtered rotational speed is monitored with respect to rotational speed oscillations. When such oscillations are detectd, their frequency is compared with a first limit value, and as a function of the comparison, a first mode or a second mode is set. In the first mode, the filter is altered and, in the second mode, parameters of a rotational-speed controller are adapted to eliminate the oscillations.

15 Claims, 8 Drawing Sheets

METHOD FOR CONTROLLING AN INTERNAL COMBUSTION ENGINE GENERATOR UNIT

This application claims the priority of German patent document 102 21 681.9, filed 16 May 2002 (PCT International Application No. PCT/EP03/04895, filed 10 May 2003), the disclosure of which is expressly incorporated by reference herein.

BACKGROUND AND SUMMARY OF THE INVENTION

The invention relates to a method of controlling an internal combustion engine-generator unit.

Normally, an internal combustion engine that is to be used as a generator drive is delivered by the manufacturer to the final customer without a clutch and a generator, which are mounted only at the final customer's facility. In order to ensure a constant nominal frequency for feeding current into an electrical network, the internal combustion engine is operated in a rotational speed control loop, in which the rotational speed of the crankshaft is detected as the controlled variable and is compared with a desired rotational speed (the "command variable"). The resulting control deviation is converted by way of a rotational speed controller to a manipulated variable for the internal-combustion engine, such as a desired injection quantity.

Since the manufacturer often does not have any proven data concerning the clutch characteristics and the moment of inertia of the generator prior to the delivery of the internal combustion engine, the electronic control unit is delivered with an enduring set of controller parameters (a so-called standard parameter set). One problem of a rotational speed control loop is that torsional oscillations, which are superimposed on the controlled variable, may be intensified by the rotational speed controller. The low frequency oscillations (such as the torsional oscillations of the 0.5th and 1st order) caused by the internal combustion engine are particularly critical. When starting the internal combustion engine-generator unit, as a result of the intensification of the rotational speed controller, the amplitudes of the torsional oscillations may become so high that a rotational limit speed is exceeded and the internal combustion engine is turned off. In practice, this means that trained personnel at the final customer's facility must adapt the standard parameter set to the on-site conditions, at high expenditures and costs.

The instability problem is countered by a rotational speed filter in the feedback branch of the rotational speed control loop. Such a rotational speed filter is disclosed, for example, in European Patent Document EP 0 059 585 B1. In this filter, the tooth period of a shaft is detected during a working cycle of the internal combustion engine (two rotations of the crankshaft, corresponding to 720 degrees). Subsequently, a filtered tooth period is computed from these tooth periods by forming the arithmetic mean. This filtered tooth period is updated after each working cycle and corresponds to a rotational speed value, which is then used to control the internal combustion engine. However, in the case of this two rotation filter, it is a problem that stable behavior of the drive system is accompanied by a deterioration of the design load behavior. A poor design load behavior may mean that, under certain circumstances the legally required design load criteria are no longer met.

It is an object of the present invention to provide a control for an internal combustion engine-generator unit which ensures a fast and reliable design load behavior.

This and other objections and advantages are achieved by the control method according to the invention, in which the filtered rotational speed is monitored with respect to rotational speed oscillations. When a rotational speed oscillation is determined, its frequency is compared with a first limit value, and as a function of the comparison, a first or second mode is set. That is, the first mode is set at a frequency which is greater than the first limit value, and the second mode is set at a frequency which is smaller than the first limit value. As noted below, in order to eliminate the oscillation the filter is altered (in a manner discussed below) in the first mode, and parameters of the rotational speed controller are adapted in the second mode.

The invention is based on the recognition that the natural frequency of such an internal combustion engine-generator unit typically is in a range of from 10 to 25 Hz.

In the first mode, the filter is altered in that a new crankshaft angle (that is the rotational angle over which the rotational speed is averaged) is used for the filtering of the actual rotational speed. The new crankshaft angle is determined by means of a characteristic curve, as a function of the frequency to be filtered out. For example, a 25 Hz oscillation is filtered out when the filter averages the actual rotational speed through a crankshaft rotation of 360 degrees. Another measure consists of reducing the P-portion and/or the D-portion of the rotational speed controller. For this purpose, a proportional action factor and/or a derivative action time is reduced.

In the second mode, the frequency is compared with a second limit value. At a frequency lower than the second limit value, a P-portion and an I-portion are adapted as parameters of the rotational speed controller. The second limit value, for example, has a value of 7 Hz. The adaptation takes place in that, after each value change, it is checked again whether rotational speed oscillations are still present.

The invention and its further developments make it possible to design the standard parameter set of the rotational speed controller for a rotationally rigid internal combustion engine-generator unit (that is, for a system without a clutch). Rotationally rigid systems are ideal systems for designing the rotational speed controller because they permit the use of a fast rotational speed controller (high proportional action factor, long derivative action time). As a result, a fast design load behavior is ensured.

By the introduction of the first limit value (for example 10 Hz), an oscillation problem can be identified. In the case of a frequency greater than the first limit value, the cause is the clutch. In the case of a frequency lower than the first limit value, the cause is a very high moment of inertia of the generator. By altering the rotational speed filter or adapting parameters of the rotational speed controller, the advantage is obtained that the system stabilizes itself. In this case, the dynamics of the system are reduced only as much as necessary so that the internal combustion engine-generator unit operates reliably. Since the standard parameter set is adapted automatically, the final customer has a freer choice of clutches. Because the need for an additional on-site adaptation is eliminated, customer servicing costs are reduced.

Another advantage is that the necessary number of standard parameter sets is lower, since no clutch-specific and/or generator specific data sets have to be created.

Other objects, advantages and novel features of the present invention will become apparent from the following detailed description of the invention when considered in conjunction with the accompanying drawings.

DETAILED DESCRIPTION OF THE DRAWINGS

Figure 1:
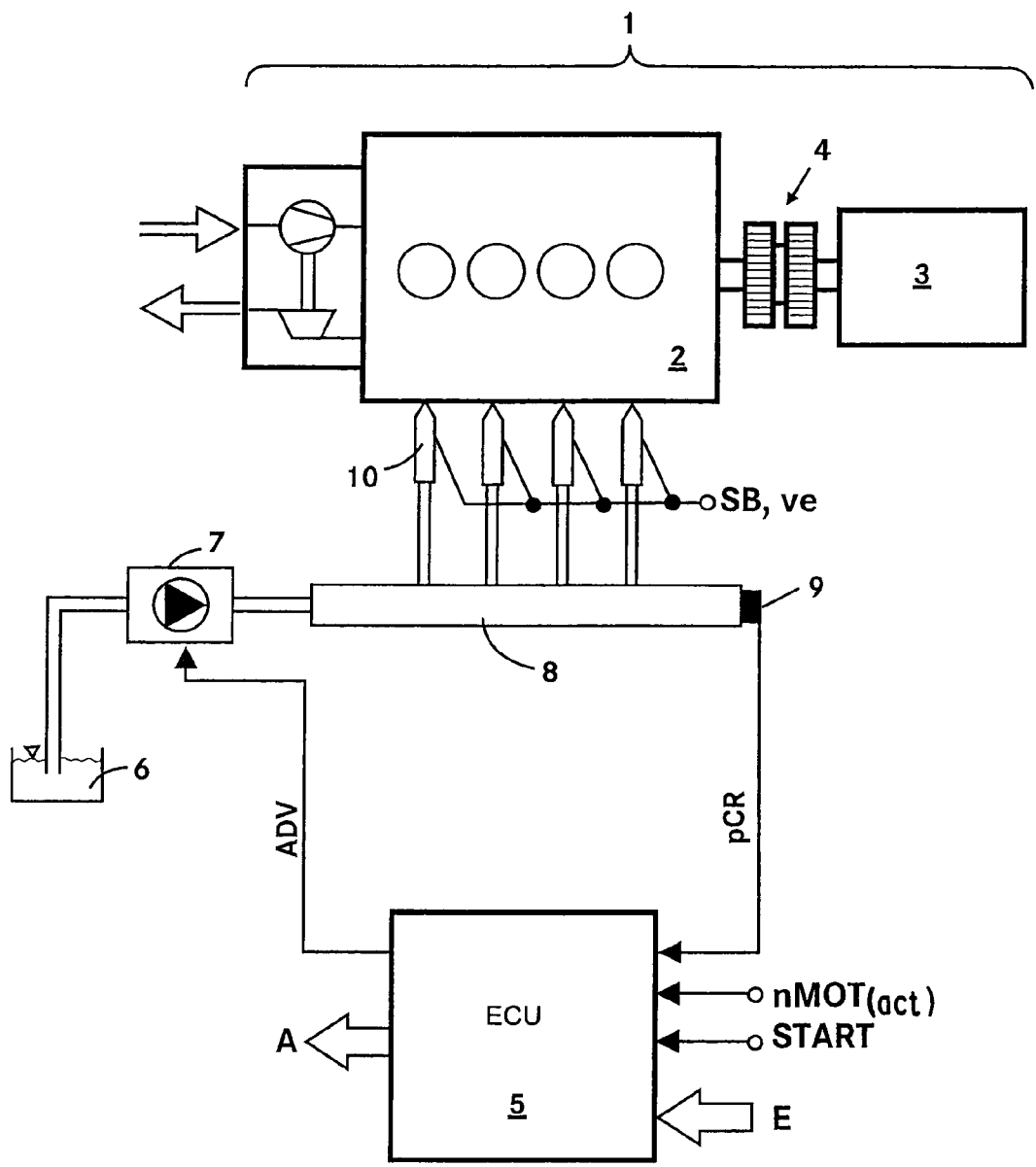
FIG. 1 is a block diagram of the entire system.

FIG. 1 illustrates a block diagram of the overall system of an internal combustion engine generator unit 1, in which an internal-combustion engine 2 drives a generator 3 via a shaft and a clutch 4. The illustrated internal-combustion engine 2 has a common rail fuel injection system, including a pump 7 with a suction throttle for delivering the fuel from a fuel tank 6, a rail 8 for storing the fuel, and injectors 10 for injecting fuel from the rail 8 into the combustion spaces of the internal-combustion engine 2.

The internal-combustion engine 2 is controlled and regulated by an electronic control unit (ECU) 5, which contains the conventional components of a microcomputer system (for example, a microprocessor, I/O components, buffers and memory chips, such as EEPROM RAM). In the memory chips, the operating data relevant to the operation of the internal-combustion engine 2 are represented in characteristic diagrams/characteristic curves, which the electronic control unit 5 uses to compute the output quantities from the input quantities. In FIG. 1, the following input quantities are illustrated as examples: A rail pressure pCR which is measured by means of a rail pressure sensor 9; an actual rotational speed signal nMOT (ACT) of the internal-combustion engine; an input quantity E and a START signal for activating the internal-combustion engine—generator unit 1. In the input quantity E, for example, the charge air pressure of a turbocharger and the temperatures of the coolant/lubricant and of the fuel are subtotalled.

As output quantities of the electronic control unit 5, a signal ADV for controlling the pump 7 with the suction throttle and an output quantity A are illustrated in FIG. 1. The output quantity A is representative of the additional control signals for controlling and regulating the internal combustion engine 2, such as the injection start SB and a desired injection quantity ve.

Figure 2:
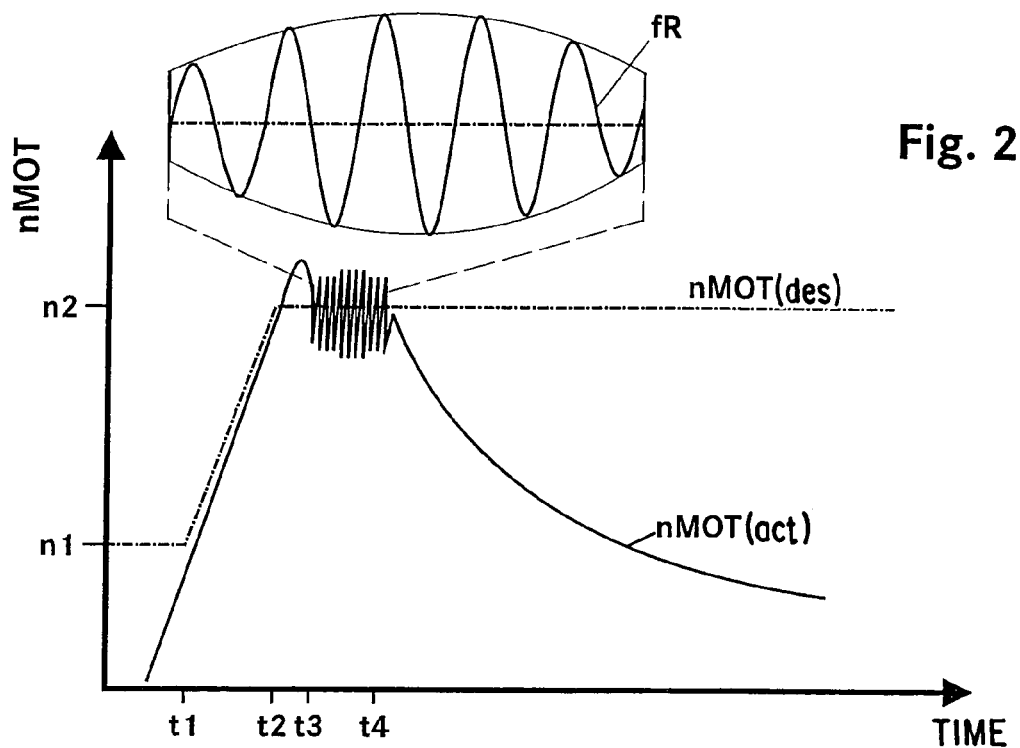
FIG. 2 is a time diagram of the starting operation.

FIG. 2 is a rotational speed-time diagram for a starting operation of an internal combustion-generator unit 1. The reference variable for the rotational speed control, corresponding to the desired rotational speed nMOT(DES), is indicated as a dash-dotted line. The actual rotational speed nMOT(ACT) is indicated by a solid line. At the point in time t1, the reference variable is increased in a ramp-shaped manner from an initial value n1 to the value n2 at the point in time t2. Starting at the point in time t2, the reference variable remains unchanged.

The actual rotational speed nMOT (ACT) first follows this reference variable. At the point in time t2, the actual rotational speed nMOT(ACT) exceeds the predefined value n2. During the time period t3 to t4, the actual rotational speed nMOT(ACT) of the internal combustion engine begins to oscillate. The causes of these rotational speed oscillations may be: An unacceptably high scattering of the injectors, the failing of at least one injector and/or a faulty design of the clutch. Such a rotational speed oscillation is illustrated in FIG. 2 as a cutout with a frequency fR. In practice, the amplitudes in the case of an internal-combustion engine at the operating temperature partly become so high that a rotational speed limit is exceeded and an emergency stop is triggered. This results in the actual rotational speed course starting at the point in time t4.

Figure 3:
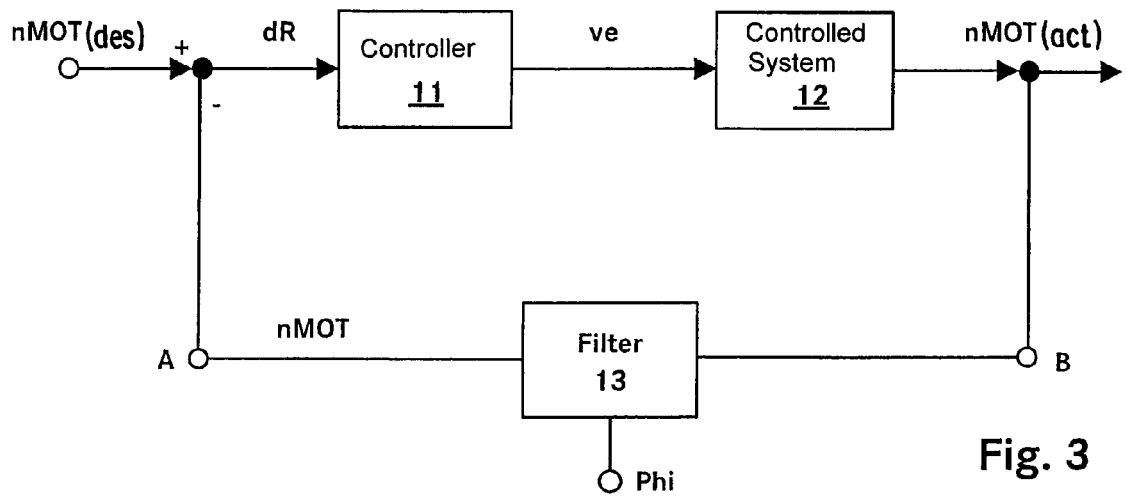
FIG. 3 is a view of a control loop.

FIG. 3 shows a control loop for the rotational speed control of an internal-combustion engine, including a rotational speed controller 11, of a controlled system 12 and of a filter 13. The input quantity of the control loop is a desired rotational speed nMOT(DES). The output quantity corresponds to the actual rotational speed nMOT(ACT). From the actual rotational speed nMOT(ACT), a filtered rotational speed nMOT is generated by means of the filter 13. A control deviation dR is determined from the filtered rotational speed nMOT and the reference variable nMOT (DES). As a function of the control deviation dR, the rotational speed controller 11 computes the control variable, corresponding to the desired injection quantity ve. The latter is guided to the controlled system 12. In this case, the injection system and the internal-combustion engine correspond to the controlled system 12. As a result, the control loop is closed.

The rotational speed controller 11 normally consists of a P-portion, an I-portion and a D-portion. The manufacturer of the internal-combustion engine furnishes the rotational speed controller 11 together with the standard parameter set. The standard parameter set is configured for a rotationally rigid system (that is, without a clutch). Such a system can be operated by means of a very fast rotational speed controller 11 (that is, one which has a large proportional action factor and a large D-portion).

Rotationally rigid systems are ideal for designing the rotational speed controller 11. If a soft clutch 4 (low spring rigidity) and/or a generator with a high moment of inertia is mounted onto the internal-combustion engine 2, the system may become unstable. As described above, this is exhibited in periodic oscillations at the actual rotational speed nMOT (ACT) and the filtered rotational speed nMOT. The frequency of this oscillation here supplies information on the cause of the instability. At a frequency fR greater than a first limit value (for example, 10 Hz), the internal combustion engine-generator unit generally vibrates at the frequency of the system, caused by the clutch 4. At a frequency fR lower than the first limit value, the instability is, for example, caused by a high moment of inertia of the generator.

Figure 4:
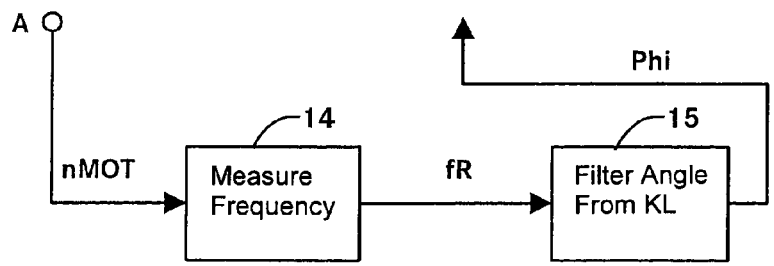
FIG. 4 is a view of a first embodiment for switching the filter.

According to FIG. 4, in conjunction with FIG. 3, the invention now provides that the frequency fR of the rotational speed oscillations is determined from the filtered rotational speed nMOT by means of a functional block 14 (branch A). Then, as a function of the frequency fR, a new crankshaft angle Phi for filtering the actual rotational speed nMOT(ACT) is computed by way of a functional block 15 by means of a characteristic curve.

Figure 6:
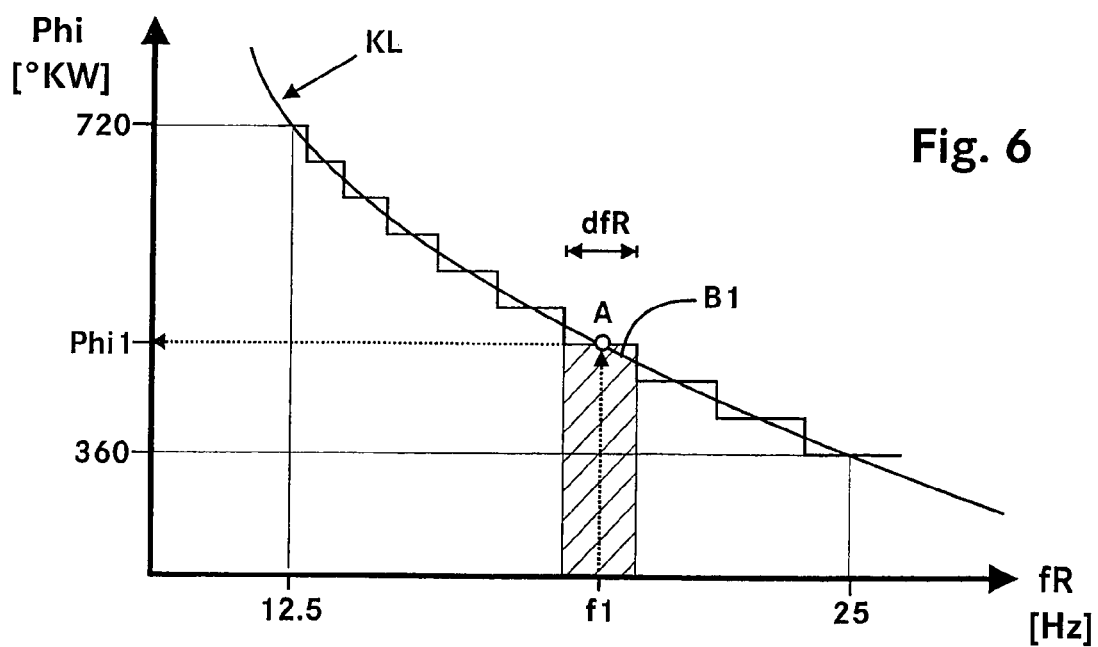
FIG. 6 is a crankshaft angle diagram over the frequency.

FIG. 6 shows the characteristic curve for an average filter and will be explained in connection with this figure. (Instead of an average filter, a filter according to German Patent Application DE 101 22 517.2 may also be used.) The new crankshaft angle Phi represents an input quantity of the filter 13. In other words: The rotational speed filter 13 is changed from the original crankshaft angle, for example, 90 degrees, over to a new value Phi. As a result of this measure, the frequency fR of the rotational speed oscillations is extracted.

Figure 5:
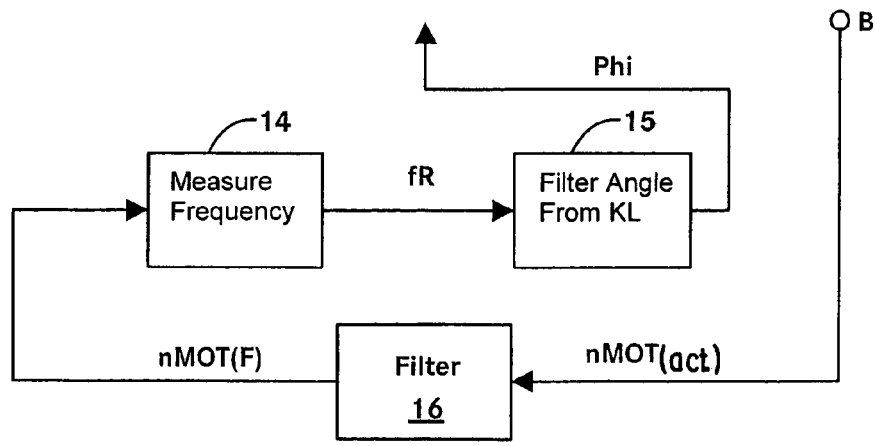
FIG. 5 is a view of a second embodiment for switching the filter.

FIG. 5 shows a variant of FIG. 4. In the latter, the actual rotational speed nMOT(ACT) is detected (branch B) and is converted by way of another filter 16 to a rotational speed nMOT(F). Corresponding to the description of FIG. 4, the new crankshaft angle Phi for the filter 13 is then computed from this rotational speed nMOT(F).

FIG. 6 shows a diagram for computing the crankshaft angle Phi as a function of the frequency fR. Here, an average filter was used as the basis. The frequency fR corresponds to the detected frequency of the rotational speed oscillation of the filtered rotational speed nMOT or nMOT(F). The crankshaft angle Phi corresponds to the angle through which the actual rotational speed nMOT(ACT) is averaged by the filter 13. An idealized characteristic curve KL is indicated. By way of this curve KL, a crankshaft angle is assigned to a frequency. For example, a value Phi1 is assigned to the frequency f1 by way of point A of the characteristic curve KL. In practice, the hyperbolic characteristic curve KL is imaged in a step function. In FIG. 6, in the case of this step function, a shaded area B1 is shown as an example. The area B1 has the width dfR and the height Phi 1. The same value Phi1 is always assigned to frequency values within the area dfR by way of this step function.

The step-type course of the characteristic curve is a result of the fact that the measuring wheel for the detection of the actual rotational speed nMOT(ACT) only has a limited number of teeth. The smallest possible detectable crankshaft angle results from the number of teeth. The actually detected crankshaft angle therefore represents an integral multiple of this minimal crankshaft angle. For example, for a measuring wheel with 120 teeth and when detecting the time between 5 teeth, a value dfR of 0.66 Hz at a frequency f1 equal to 20 Hz and an actual rotational speed nMOT(ACT) of 1,500 revolutions per minute is obtained. The width dfR of the areas is enlarged with an increasing frequency fR, because the frequency fR and the crankshaft angle Phi are inversely proportional to one another. The limit values illustrated on the abscissa and the ordinate typically correspond to a generator application with 50 Hz power frequency.

Figure 7:
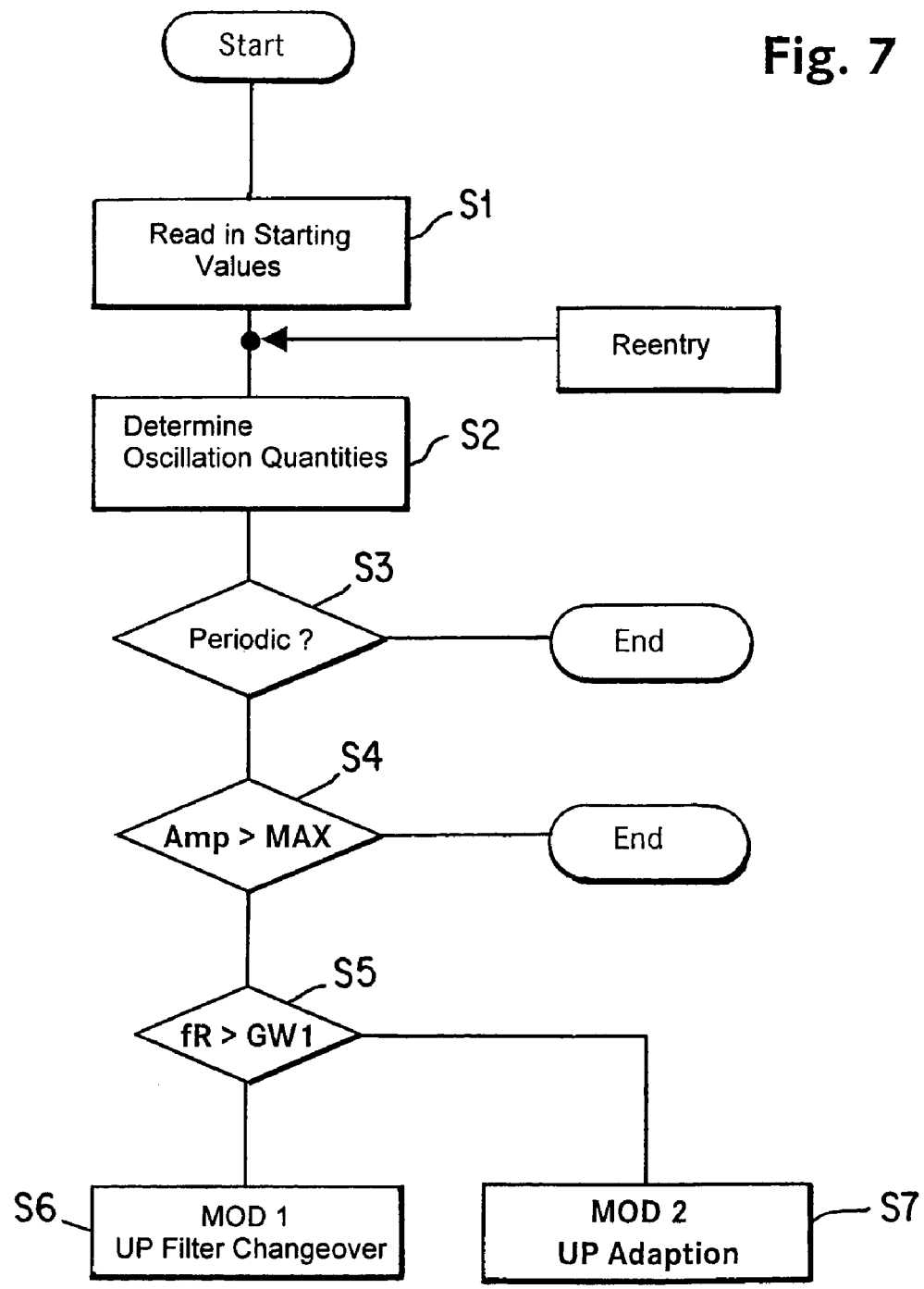
FIG. 7 is a flow chart of the main program for determining the rotational speed oscillations.

FIG. 7 is a flow chart which shows a main program for determining the frequency of the rotational speed oscillations. At S1, the starting values are read in; for example, the crankshaft angle Phi for the filter 13 and the parameters of the rotational speed controller 11 (proportional action factor, reset time, derivative action time). At S2, the oscillation quantities (amplitude Amp, frequency fR) of the rotational speed oscillation at the filtered rotational speed nMOT or nMOT(F) are determined. Then it is checked at S3 whether the detected oscillation is periodic. In the case of an aperiodic oscillation, the program flow is terminated. At S4, it is checked whether the detected amplitude Amp is greater than a maximal value MAX. If not, the program flow is terminated. When the test result is positive (that is, the oscillation is periodic and the amplitude Amp is greater than the maximal value MAX), it is checked whether the frequency fR is greater than a first limit value GW1, S5. If so, the first mode MOD1 is set at S6, and the filter change-over subroutine is invoked, explained in connection with FIGS. 8 to 11. When the frequency fR is lower than the first limit value GW1, the second mode MOD2 is set and the adaptation subroutine is activated, which is explained in connection with FIG. 12. The return from the two subroutines takes place by way of a "reentry" label.

Figure 8:
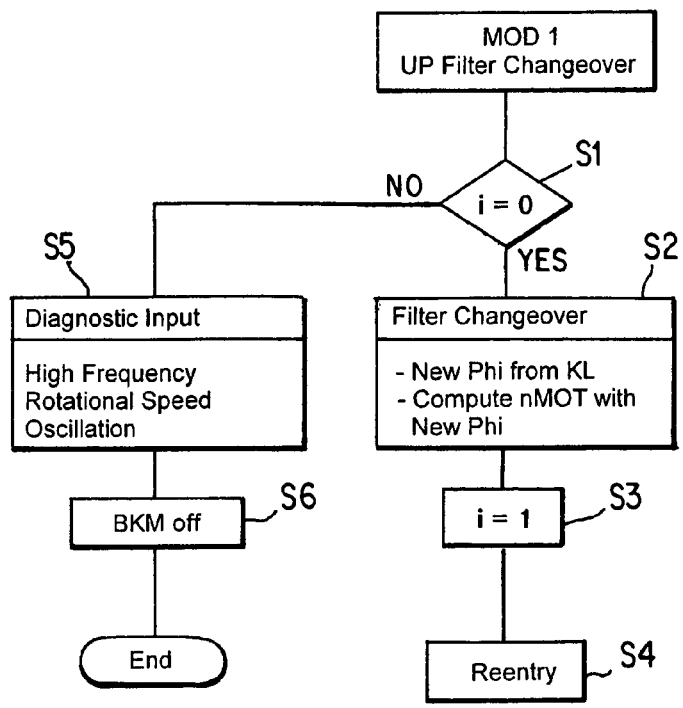
FIG. 8 is a program flow chart of the filter change-over.

FIG. 8 illustrates the filter change-over subroutine. At S1, it is checked by means of a variable i whether the filter 13 is already switched over. In the case of an unaltered filter, a new crankshaft angle Phi is determined at S2 corresponding to the diagram of FIG. 6. Subsequently, the filtered rotational speed nMOT is computed with the new crankshaft angle Phi from the actual rotational speed nMOT(IST). At S3, the variable i is set to be equal to one, and the process returns to the main program at S4. When it is determined in step S1 that the first mode MOD1 has already been activated and the filter 13 has already been changed over, a diagnostic input takes place at S5. The latter documents a rotational speed oscillation of a high frequency. The diagnostic input can then be read out of the electronic control unit 5 with the marginal conditions. In addition, a warning indication is activated which informs the operator. An emergency shut-off for the internal-combustion engine is then activated at S6. This terminates the program flow.

Figure 9:
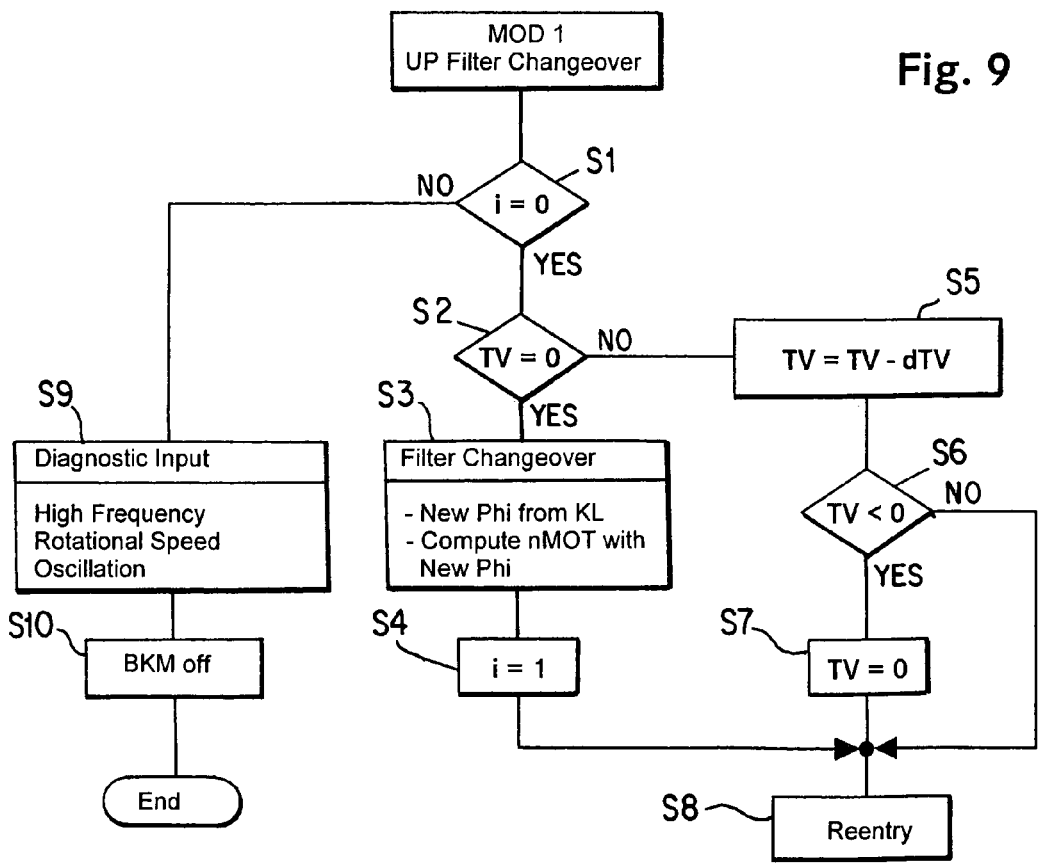
FIG. 9 is a program flow chart of the filter change-over with a D-portion reduction.

A filter change-over subroutine with a reduction of the D-portion is illustrated in FIG. 9. This program flow chart differs from that of FIG. 8 by the addition of steps S2 to S7. The additional explanation relates to these supplements. The reduction of the D-portion of the rotational speed controller 11 takes place by way of the reduction of a derivative action time TV. As known, the D-portion (differential portion) is defined as follows:

$$ve(D) = (ddR/dt) \cdot TV \cdot kp$$

wherein

| | |
|---|---|
| ve(D) = | D-portion of the desired injection quantity ve |
| ddR/dt = | gradient of the rotational speed control deviation |
| TV = | derivative action time(s) |
| kp = | proportional action factor ((mm3 · min)/stroke) |

At S2, it is checked whether the derivative action time TV is equal to zero. If not, TV is reduced by a value dTV at S5 and checked at S6 to determine whether it is smaller than zero. If not, the program flow branches to S8 with the reentry into the main program, corresponding to FIG. 7. In the main program, it is then determines whether rotational speed oscillations are still occurring despite the reduced D-portion.

If the check at S6 determines that the derivative action time TV is lower than zero, the latter is set to zero at S7 the process moves into the main program at S8. If the check at S2 reveals that the derivative action time TV was already reduced to zero, the filter change-over takes place at S3; the setting of the variable i takes place at S4; and the reentry into the main program takes place at S8. If rotational speed oscillations are still determined—query S1 equal to negative—despite the reduction of the derivative action time TV and the filter change-over, a diagnostic input and an emergency shut-off corresponding to the description of FIG. 8 is carried out at S9 and S10. This terminates the program flow.

Figure 10:
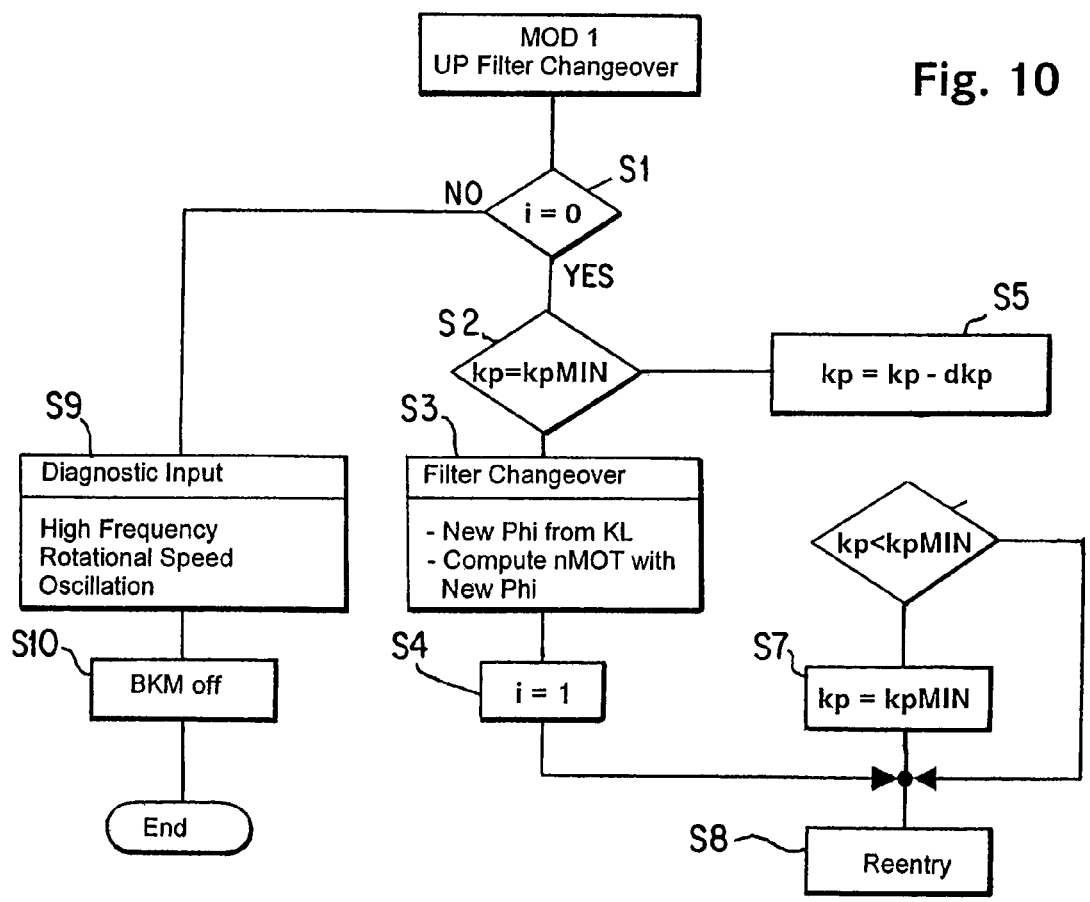
FIG. 10 is a program flow chart of the filter change-over with a P-portion reduction.

FIG. 10 is a flow chart which illustrates the filter change-over subroutine, with a reduction of the P-portion. The latter differs from the first embodiment according to FIG. 9 in that here the proportional action factor kp is reduced. For this purpose, it is checked at S2 whether the proportional action factor kp is equal to a minimal value kpMIN. If not, the latter is reduced by a value dkp at S5 and at S6, it is checked whether the proportional action value kp is already lower than kpMIN. If not, the program flow branches at S8 with the reentry into the main program, corresponding to the program flow chart of FIG. 7. If it is determined at S6 that the proportional action factor kp already is smaller than kpMIN, the proportional action factor kp is set to kpMIN at S7, and a return into the main program takes place at S8. The additional branches of the program flow chart correspond to the program flow chart of FIG. 8, so that the explanations made there apply in this case.

Figure 11:
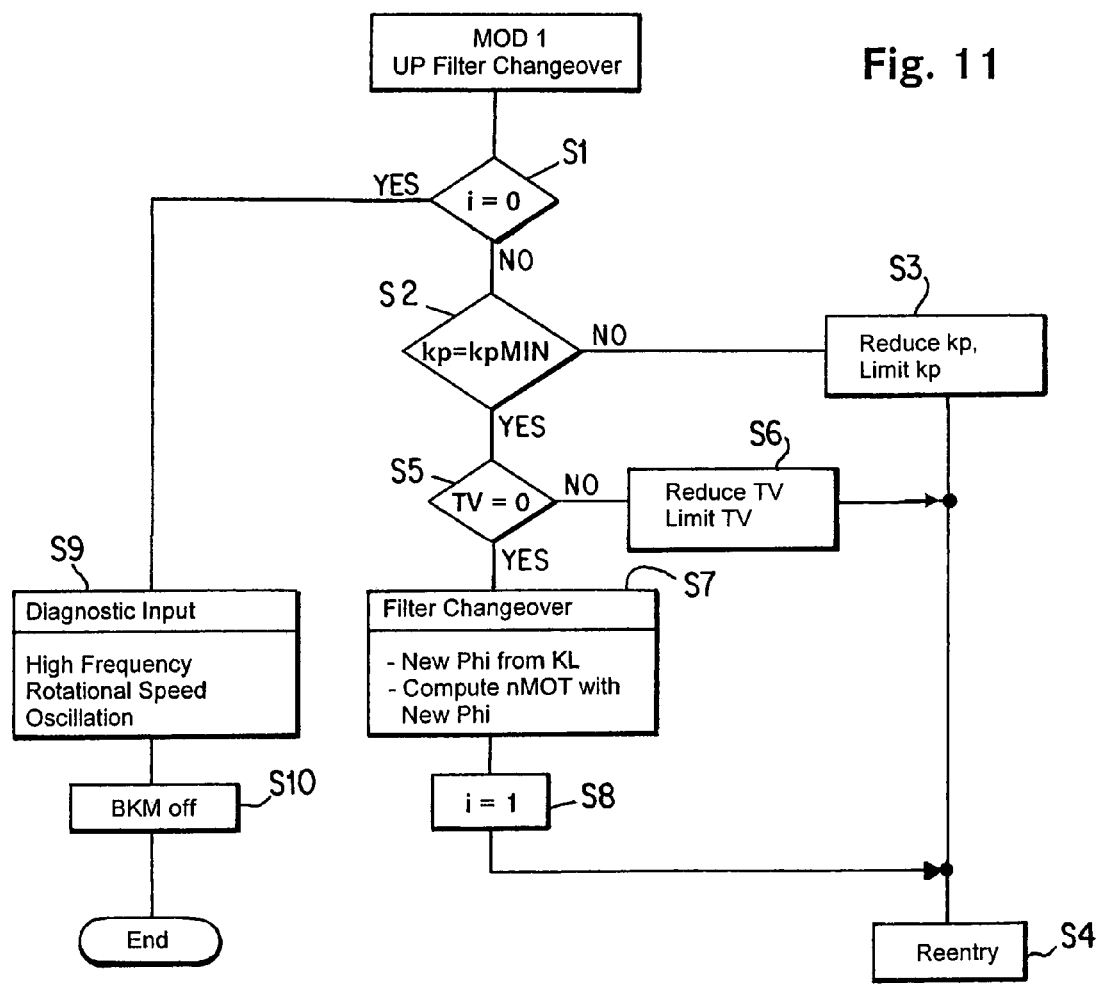
FIG. 11 is a program flow chart of the filter change-over with a P-portion and D-portion reduction.

FIG. 11 is a program flow chart of the filter change-over subroutine with a reduction of the P-portion and of the D-portion. In S1 it is determined whether the filter 13 has already been switched over. If not, it is checked at S2 whether the proportional action factor kp is equal to the minimal value kpMIN. If it is not, a pass through step S3 takes place. (The latter contains steps S5 to S7 of FIG. 10.) At S4, a branching takes place into the main program, corresponding to FIG. 7. If it is determined at S2 that kp is equal to the minimal value kpMIN, it is checked at S5 whether the derivative action time TV is equal to zero. If it is not, a pass through step S6 takes place. (The latter contains the steps S5 to S7 of FIG. 9.) At S4, a return takes place into the main program. If it is determined at S5 that the derivative action time TV is equal to zero, the filter is switched over at S7 corresponding to the characteristic curve of FIG. 6. At S8, the variable i is then set to one, and a return takes place into the main program. If it is determined at S1 that all previous measures (that is, the reduction of the proportional action factor kp, the reduction of the derivative action time TV and the filter change-over), have not achieved the goal of eliminating the rotational oscillations, a diagnostic input takes place at S9. Then, the emergency shut-off for the internal-combustion engine is triggered at S10. This terminates the program flow.

Figure 12:
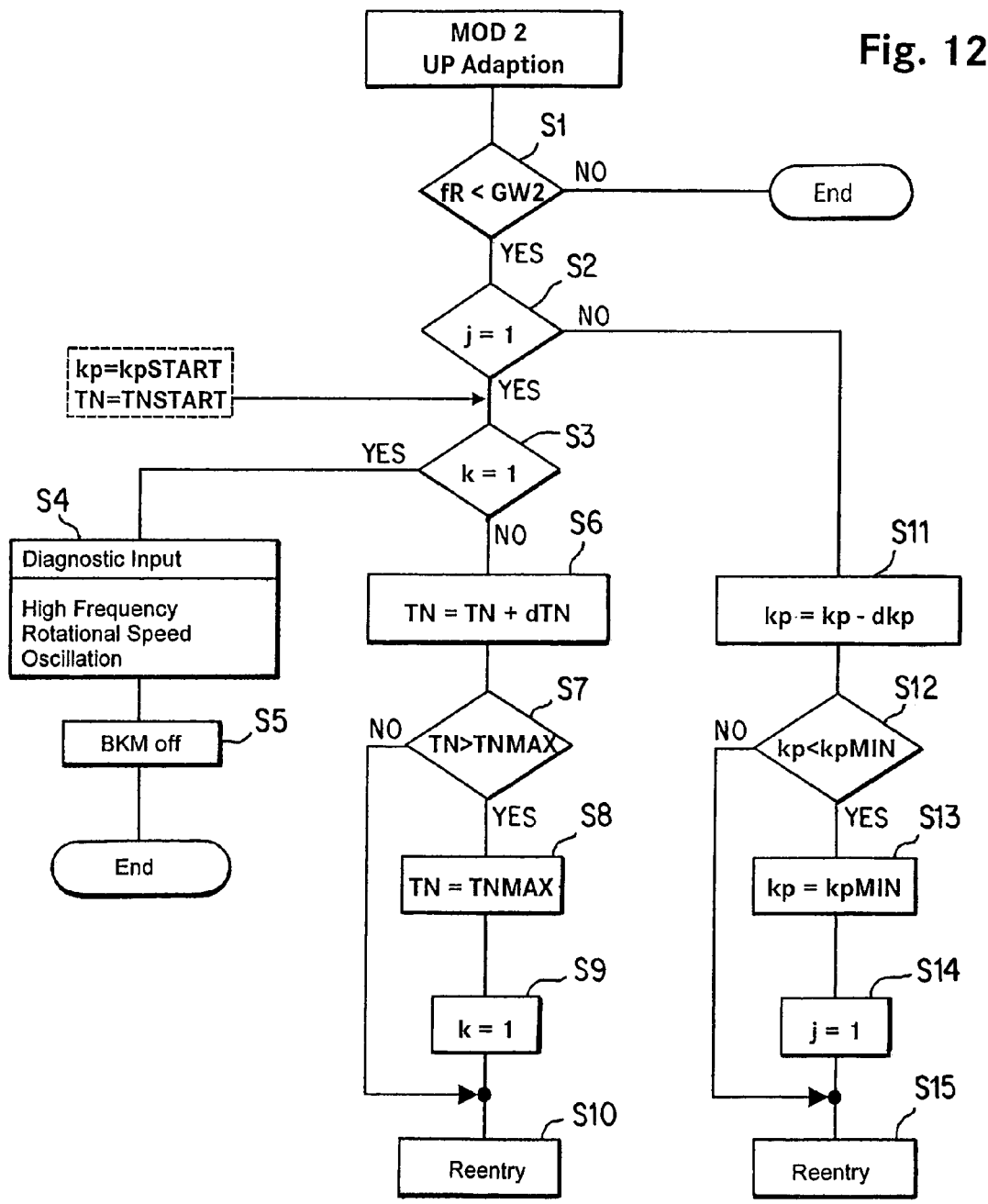
FIG. 12 is a program flow chart of the adaptation of the parameters of the rotational speed controller.

FIG. 12 illustrates the program flow chart of the adaptation subroutine of the parameters of the rotational speed controller 11. This subroutine is activated in the second mode MOD2. By way of this subroutine, the parameters of the rotational speed controller 11 are adapted corresponding to the P-portion and I-portion. As known, the following relations apply to the P-portion and the I-portion:

$$ve(P)=dR \cdot kp$$

wherein
ve(P)=P-portion of the desired injection quantity ve
dR=rotational speed control deviation (1/min)
kp=proportional action factor ((mm3.min)/stroke)

or $$ve(I)=(1/TN) \, INT(dR \cdot dt)$$

wherein
ve(I)=I-portion of the desired injection quantity ve
dR=rotational speed control deviation (1/min)
INT=integral
TN=reset time (s)

In this program flow chart, first the proportional portion and then the integral portion is reduced. In the case of very small generators (having a low moment of inertia), this approach rapidly results in a stable behavior. However, in the case of very large generators, it is more advantageous first to reduce the integral portion and then the proportional portion. At S1, it is checked whether the frequency fR is lower than a second limit value GW2. If not, the program flow is terminated. In practice, the second limit value GW2 corresponds, for example, to a frequency of 7 Hz. If the check is positive, it is checked at S2 whether a variable j is set equal to one. This variable j will be set when the proportional action factor kp has already been adapted up to a limit value kpMIN. If not, the latter is reduced at S11 by a value dkp. Then it is checked at S12 whether the proportional action value kp is already smaller than the limit value kpMIN. If not, a reentry into the main program, corresponding to FIG. 7, takes place at S15. If the check at S12 reveals that the proportional action value kp is smaller than the limit value kpMIN, the latter is set to the limit value kpMIN at S13, and the variable j is set to be equal to one at S14. Then the reentry into the main program takes place at S15.

If it is recognized during the query in S2 that the proportional action factor kp has already been completely adapted and rotational speed oscillations are still present, a check of whether a variable k is set equal to one takes place at S3. This variable will be set to one if the reset time TN of the I-portion was adapted to a limit value TNMAX. If the variable k is not equal to one, the reset time TN is increased by a value dTN at S6. Subsequently, it is checked at S7 whether this reset time TN exceeds the limit value TNMAX. If not, the reentry into the main program takes place at S10. If it is determined at S7 that the reset time TN is greater than the limit value TNMAX, this reset time TN is set to the limit value TNMAX at S8, and the variable k is set to one. Then a branching takes place into the main program.

If it is recognized at S3 that the proportional action factor kp as well as the reset time TN had already been adapted, a diagnostic input rotational speed oscillation of a low frequency takes place at S4. In a supplementary manner, it may also be provided at S3 that, before the diagnostic input, the proportional action factor kp and the reset time TN are set back to their starting values kpSTART/TNSTART. At S5, the emergency shut-off for the internal-combustion engine is then activated. This terminates the program flow.

As indicated in the preceding description, the invention has the following advantages:
The controller parameters are automatically optimized for the respective system;
greater selectability when selecting the clutch;
the customer servicing costs are reduced; and
system-specific data sets are no longer necessary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method of controlling an internal combustion engine-generator unit, comprising:
controlling rotational speed of the internal-combustion engine in a control loop by detecting actual rotational speed of the internal-combustion engine as a controlled variable, converting the actual rotational speed to a filtered rotational speed by means of a filter, and forming a control deviation for influencing a rotational speed controller, based on the filtered rotational speed and a desired rotational speeds;
monitoring the filtered rotational speed for rotational-speed oscillations;
when a rotational speed oscillation is detected, comparing a frequency of said oscillation with a first limit value; and as a function of said comparison, setting either a first mode or a second mode which eliminates said oscillation;

wherein, in the first mode, the filter is modified, and in the second mode parameters of the rotational speed controller are adapted.

2. The method according to claim 1, wherein, at a frequency of said oscillations greater than the first limit value, the first mode is set; and at a frequency of said oscillations lower than the first limit value, the second mode is set.

3. The method according to claim 2, wherein in the first mode, the filter modified in that new parameters are used in a filter algorithm.

4. The method according to claim 3, wherein the filter is constructed as an average-value filter, and a new crankshaft angle is set as a new parameter during the switch over a modification.

5. The method according to claim 4, wherein a new crankshaft angle is determined by way of a characteristic curve.

6. The method according to claim 1, wherein, a D-portion of the rotational-speed controller is reduced in the first mode.

7. The method according to claim 6, wherein the D-portion is reduced by one of a derivative action time and a proportional action factor.

8. The method according to claim 1, wherein a P-portion of the rotational-speed controller is reduced in the first mode.

9. The method according to claim 8, wherein the P-portion is reduced by way of a proportional action factor.

10. The method according to claim 1, wherein:

in the second mode, the frequency of the oscillations is compared with a second limit value; and, at a frequency lower than the second limit value, a P-portion and an I-portion are adapted as parameters of the rotational-speed controller.

11. The method according to claim 10, wherein the P-portion is adapted by reducing a proportional action factor to a limit value.

12. The method according to claim 10, wherein the I-portion is adapted by increasing a reset time to a limit value.

13. The method according to claims 10, wherein adaptation takes place as a function of a moment of inertia of the generator.

14. The method according to claims 10, wherein in the second mode, after an unsuccessful adaptation, one of the proportional action factor and the reset time is set to the starting values before the adaptation.

15. The method according to claim 1, wherein a diagnostic input and a shutting-off of the internal combustion engine-generator unit takes place when rotational speed vibrations remain unchanged in the first mode or the second mode.

* * * * *